Figure 1:
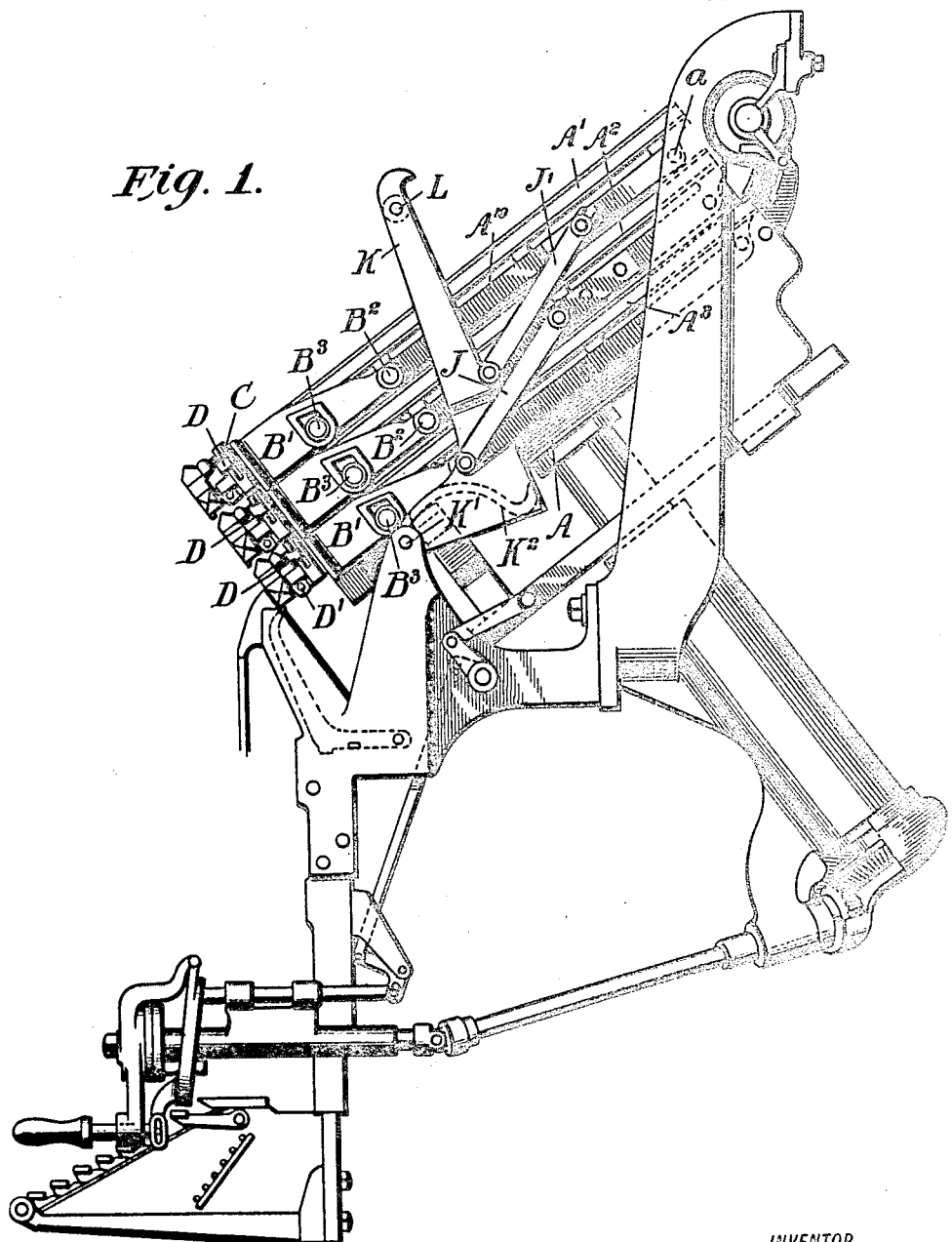

T. S. HOMANS.
TYPOGRAPHICAL MACHINE.
APPLICATION FILED APR. 23, 1912.

1,101,282.

Patented June 23, 1914.
5 SHEETS—SHEET 1.

WITNESSES:
Geo. P. Kingsbury
L. C. Morrison

INVENTOR
Thomas S. Homans
BY
P. T. Dodge
ATTORNEY

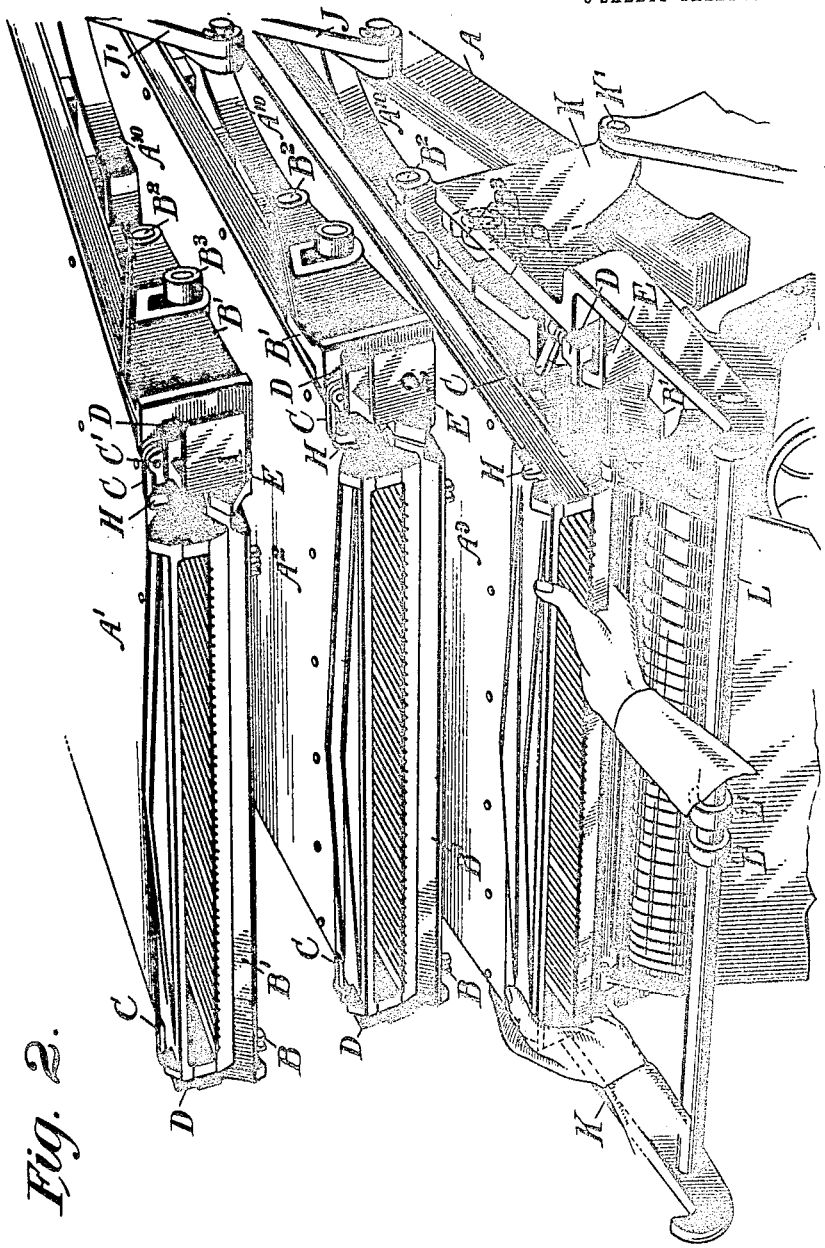

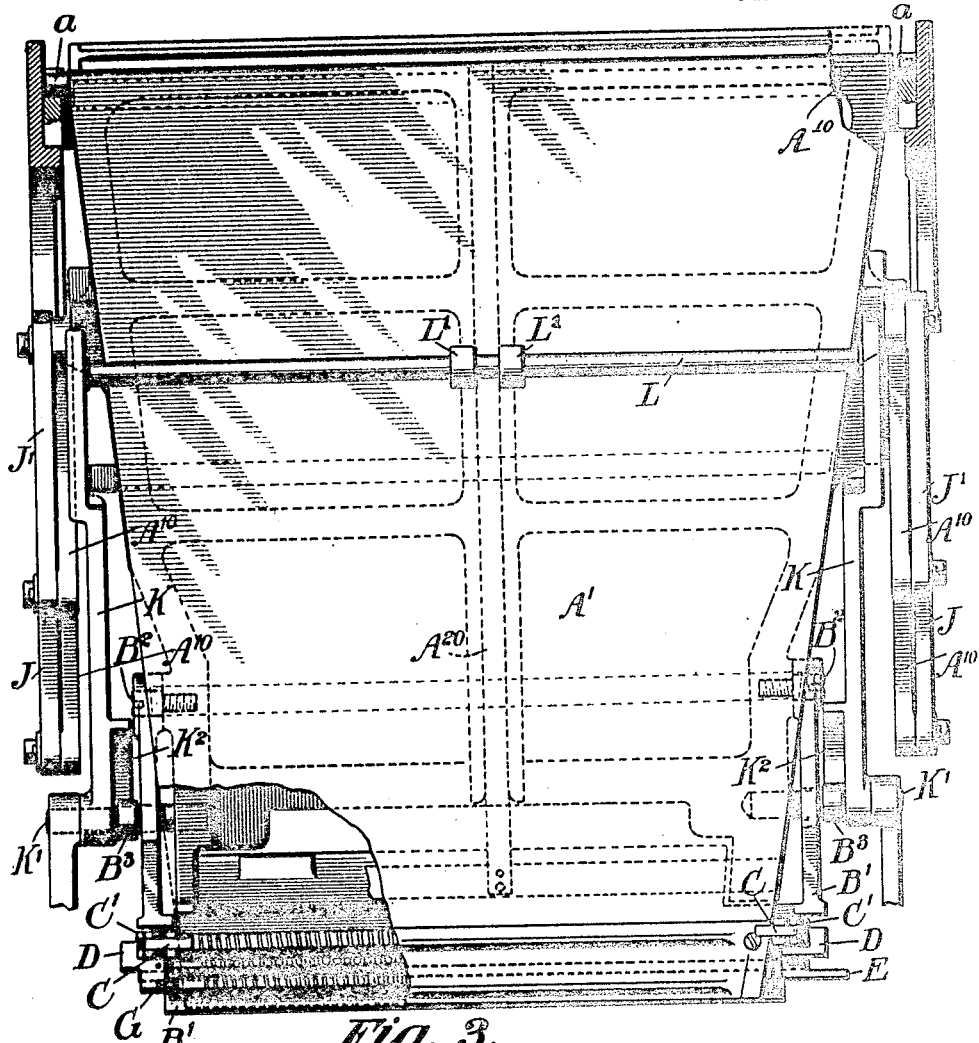
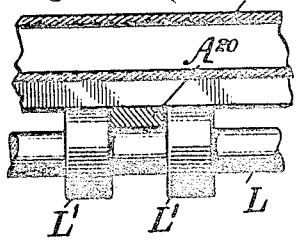

T. S. HOMANS.
TYPOGRAPHICAL MACHINE.
APPLICATION FILED APR. 22, 1912.
1,101,282.
Patented June 23, 1914.
5 SHEETS—SHEET 4.
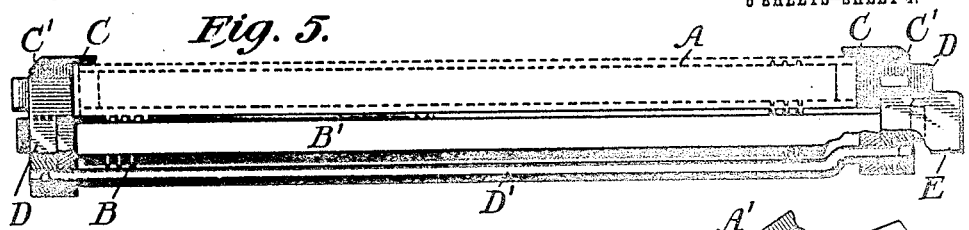
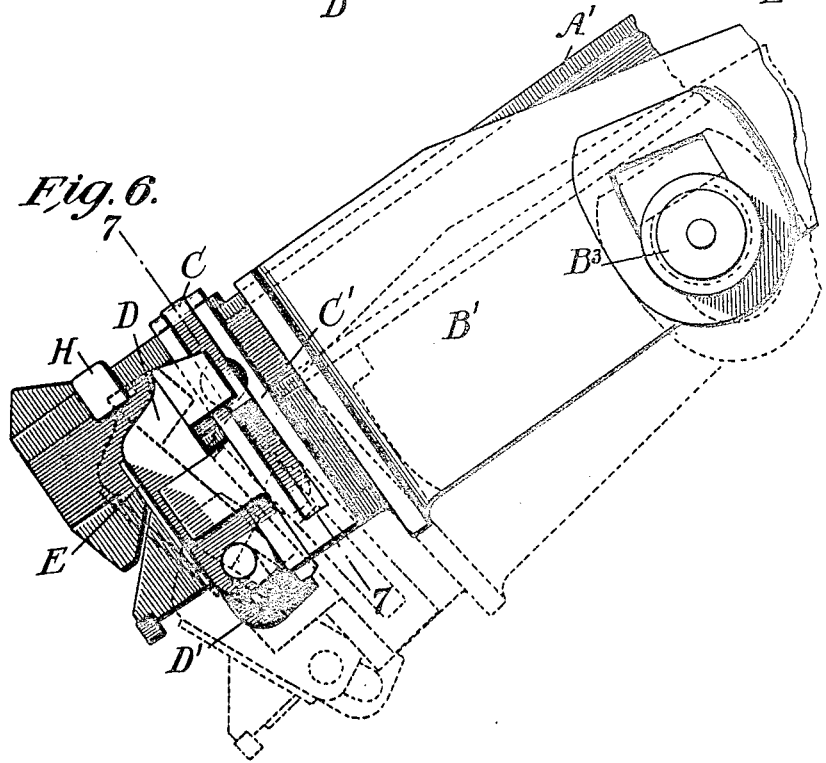
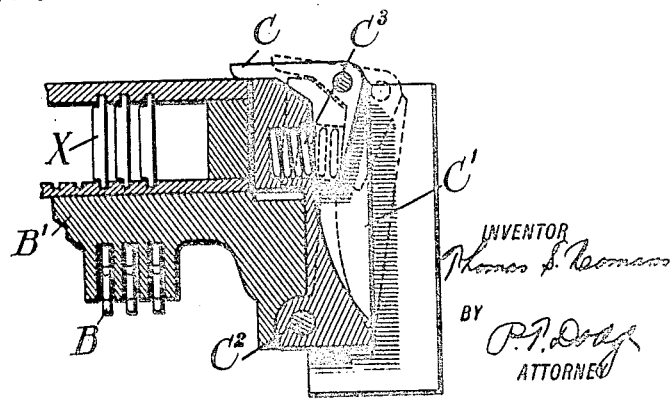

T. S. HOMANS.
TYPOGRAPHICAL MACHINE.
APPLICATION FILED APR. 22, 1912.
1,101,282.
Patented June 23, 1914.
5 SHEETS—SHEET 5.
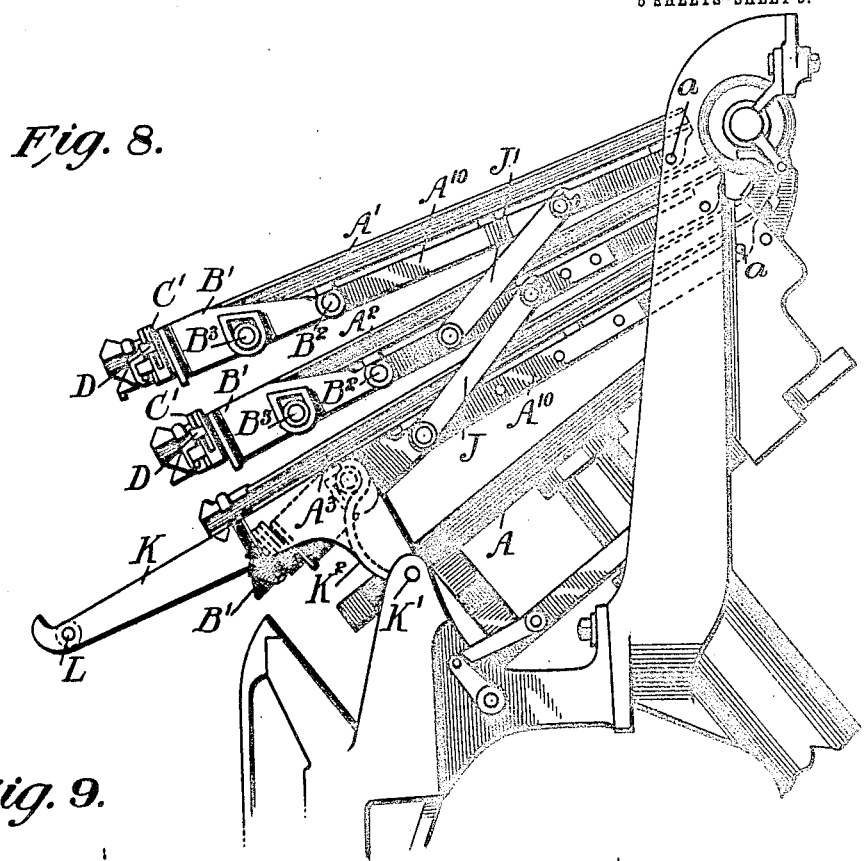
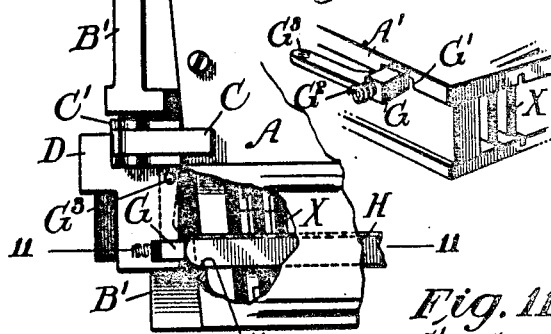
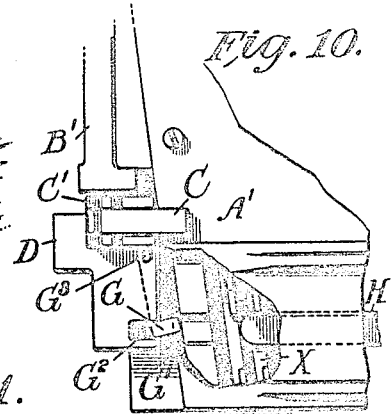
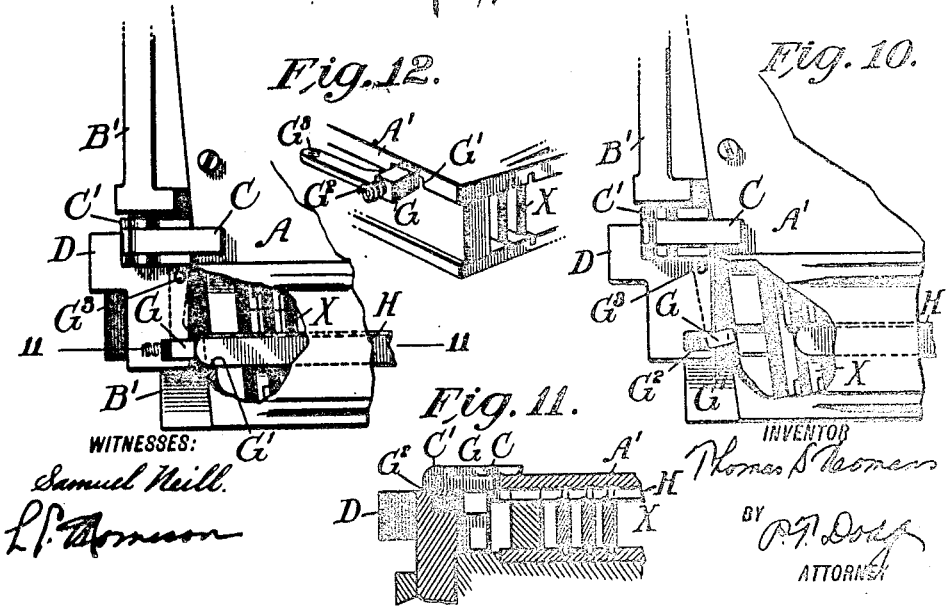
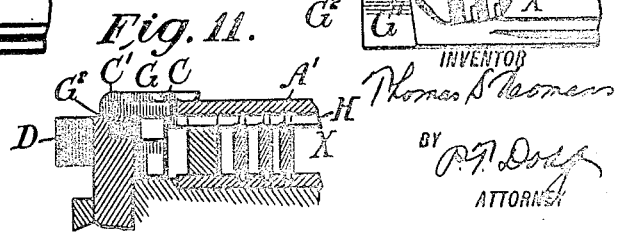

UNITED STATES PATENT OFFICE.

THOMAS SIMMONS HOMANS, OF BROOKLYN, NEW YORK, ASSIGNOR TO MERGENTHALER LINOTYPE COMPANY, A CORPORATION OF NEW YORK.

TYPOGRAPHICAL MACHINE.

1,101,282.  Specification of Letters Patent.  Patented June 23, 1914.

Application filed April 22, 1912. Serial No. 692,450.

*To all whom it may concern:*

Be it known that I, THOMAS SIMMONS HOMANS, a citizen of the United States, and a resident of Brooklyn, county of Kings, and State of New York, have invented a new and useful Improvement in Typographical Machines, of which the following is a specification.

My invention relates to typographical machines, such as linotype machines of the organization represented in Letters Patent of the United States, No. 436,532, to O. Mergenthaler, wherein circulating matrices are released from a magazine or magazines in the order in which their characters are to appear in print and then assembled in line together with expanding spacers, the composed line transferred to the face of a mold, the mold filled with molten metal to form a slug or linotype against the matrices which produce the type characters thereon, and the matrices thereafter elevated and returned through a distributing mechanism to the magazine or magazines from which they started. More particularly, it is illustrated in connection with that kind of machine disclosed in the application for Letters Patent of J. R. Rogers, No. 624,426, filed May 1, 1911, wherein a series of magazines is employed in connection with means whereby any selected one thereof may be shifted into operative position and registered and locked therein; and wherein the magazines are individually removable and exchangeable, and to that end are each pivotally mounted, to permit their convenient separation and manipulation; and wherein each magazine is provided with a bank of escapements detachably mounted, so as to facilitate further the removal of the magazine and the substitution of another therefor. In the present instance, I show the escapement bank as pivotally connected to the supporting frame, in such manner that it may be readily disengaged from the magazine and moved out of the way, to permit the removal of the latter and the substitution of another, after which it may be swung back into operative relation to the new magazine and securely engaged therewith. In connection with the engaging and disengaging means, I also provide safety devices which prevent the detachment of the bank of escapements from the magazine, unless and until the matrices are securely locked therein, so as to prevent their accidental displacement or spilling therefrom during its subsequent manipulation. I further provide means to facilitate the separation of the magazines to permit their removal and replacement, and also means to steady and support the magazines during their passage to and from the machine.

In the accompanying drawings, as before stated, I have shown my invention as applied to a linotype machine, but obviously it may be used in connection with other forms of typographical machines, such as type-setters, type-casters, or the like, and obviously also many changes and variations may be made therein without departing from its spirit.

Generally speaking, I desire it to be understood that I do not limit myself to any specific form or embodiment, except in so far as such limitations are specified in the claims.

Referring to the drawings: Figure 1 is a side view of a portion of a linotype machine of the class described, having my invention applied thereto; Fig. 2 is a front perspective view, on an enlarged scale, particularly indicating the method of removing a magazine; Fig. 3 is a top plan view, partly broken away, of the magazines, etc.; Fig. 4 is a sectional detail, showing the supporting means for a magazine during its removal or replacement; Fig. 5 is a front view, partly broken away, of an escapement bank, etc.; Fig. 6 is a side view thereof, on an enlarged scale; Fig. 7 is a sectional view, taken substantially on the line 7—7 in Fig. 6; Fig. 8 is a side view, showing the magazines as separated prior to the removal of one of them; Fig. 9 is a plan detail, on an enlarged scale and partly broken away, of the safety device; Fig. 10 is a similar view, the parts being in different position; Fig. 11 is a section, taken substantially on the line 11—11 in Fig. 9; and Fig. 12 is a perspective detail, showing the normal engagement of the safety catch with the magazine.

Referring first to Fig. 1 of the drawings, many of the parts are or may be substantially the same as those disclosed in the said Rogers application. The magazines $A^1$, $A^2$, $A^3$, are mounted in the shift frame A, which may be moved to bring any selected one into operative position, the particular means for so moving the frame A, and for locking and registering it, constituting no part of my present invention. Also as in the said Rogers application, the magazines $A^1$, $A^2$, $A^3$, rest upon individual magazine frames $A^{10}$, each of which is pivotally connected, as at $a$, to the shift frame A.

In the present instance, the escapements B for each magazine are arranged in a series or bank and are carried by a movable frame $B^1$, pivotally connected at $B^2$ to the supporting frame $A^{10}$, the extent of pivotal movement with relation thereto being controlled by slots formed in the frame $B^1$, and through which extend studs and rollers $B^3$ projecting from the frame $A^{10}$. The further function of these rollers will be described at a later point in the specification.

The frame $B^1$ is held in normal relation to its corresponding magazine by latches or projecting arms C, carried by the blocks $C^1$ pivoted at $C^2$ to the frame $B^1$, (see more particularly Figs. 2, 3, 5, 6 and 7). It will be understood that the frame $B^1$ is provided with such a latch at each side of the magazine so as to maintain the escapements in positive and correct relation thereto. Preferably the latches C are pivotally connected to the blocks $C^1$ and are pressed downwardly by interposed springs $C^3$, in order to give the latches a slight yielding movement with reference to the blocks $C^1$ and to permit their ready and accurate engagement with the magazine, when the frame $B^1$ is brought into operative relation thereto. In order to hold the pair of latches C in firm and correct relation to the magazine, I also provide a pair of holding blocks D, correspondingly located at opposite sides of the magazine and mounted upon the transverse rock shaft $D^1$, so that they may be simultaneously moved to engage and disengage laterally with the blocks $C^1$. Preferably I connect a plate E to one of the locking blocks D, whereby both blocks may be moved to and from their operative locking position. In connection with each pair of blocks D, I also provide a safety device to prevent their manipulation, unless the matrices X be securely locked and held within the magazine, so they will not be displaced or spilled therefrom during the subsequent handling of the detached magazine. In the example shown (see Figs. 3, 9, 10, 11 and 12), this safety device takes the form of a catch G, pivotally connected at $G^3$ to the left-hand block D, and normally pressed by a spring $G^2$ into a notch $G^1$ formed in the upper plate of the magazine, such as $A^1$. In this position of the parts, the engagement of the catch G with the notch $G^1$ (see Figs. 10 and 12) prevents the forward movement of the blocks D and consequently the release of the blocks $C^1$ and latches C. The matrices X are locked and held in the magazine, before the removal of the latter, in the usual way, namely by the insertion of a transverse rod H through and across the lower ends of the magazine channels, in such manner as to hold the matrices therein. The parts are so arranged and located that when the rod H is thus inserted (see Figs. 9 and 11), its end contacts with the catch G and removes it from the notch $G^1$, thus permitting the forward movement of the blocks D and the release of the blocks $C^1$ and latches C, which may now be manually disengaged from the magazine. The frame $B^1$ is now free to be swung about its pivots $B^2$, thus disengaging the escapements B from the magazine, and permitting the removal of the latter from its frame $A^{10}$ and the substitution of another one if desired. When another magazine is brought into position upon the frame $A^{10}$, the reverse operation is followed, namely, the frame $B^1$ is swung upwardly to operative position, the blocks $C^1$ and latches C are moved inwardly to engage the magazine, and the blocks D are moved transversely to engage and hold the blocks $C^1$, after which the rod H may be removed, thereby allowing the engagement of the safety catch G with the notch $G^1$ of the new magazine. It will be noted that the matrix locking rod H cannot be removed from the magazine until the block D is moved home, as clearly disclosed by dotted and full lines in Fig. 6. This arrangement prevents the premature unlocking of the matrices, which are therefore securely held within the magazine until the escapements are actually clamped thereto.

I have also devised means to simplify the separation of the magazines $A^1$, $A^2$, $A^3$, and to permit them to be readily removed and interchanged. As previously described, and as disclosed in the said Rogers application, the individual magazine frames $A^{10}$ are pivotally connected at $a$ to the shift frame A. In the present instance, I connect the several frames $A^{10}$, or extended portions thereof, by inclined links J and $J^1$. For instance, the links J are pivotally connected at opposite sides to the two lower frames,—to the upper one at a point nearer its pivot $a$ than to the under one; and similarly the links $J^1$ are pivotally connected to the two upper frames,—to the uppermost one at a point nearer its pivot $a$ than to the under one. Due to these link connections, it follows that when one of the under frames $A^{10}$ is moved about its pivot, the upper frame will be simultaneously moved, and because of the different points of connection of the links, and due to the different leverage thus involved, when an under frame is elevated, the frame above it will be moved to a different angular extent about its pivot, thus automatically effecting their separation, as best disclosed in Figs. 2 and 8.

The specific means for elevating the selected frame $A^{10}$, and the magazine thereon, to permit its removal therefrom, are somewhat similar to those already known in the art, and comprise a pair of oppositely located arms K, pivotally mounted at $K^1$ on the machine frame, and each provided with a cam surface $K^2$ to engage the previously mentioned rolls $B^3$ projecting from the frame $A^{10}$, as best shown in Fig. 3.

The operation of the parts will be readily understood. If it be desired to remove a magazine, for instance the lowermost one $A^3$, the latter is moved into operative position by the frame A in the manner disclosed in the said Rogers application, at which time the rollers $B^3$ of its frame $A^{10}$ are brought into operative relation to the cam surfaces $K^2$ of the arms K (see Figs. 1 and 3). The arms K are then swung forwardly, to elevate the frame $A^{10}$ and magazine $A^3$, and to separate the magazine $A^2$ therefrom, (see Figs. 2 and 8), and the frame $B^1$ carrying the bank of escapements B having been freed from engagement with the magazine $A^3$, the latter may be removed in the customary manner, and replaced by a different one if desired.

Referring to Figs. 2, 3 and 4, I preferably connect the ends of the arms K by a transverse rod L, which subserves the double function of insuring the simultaneous operation of the arms K, and later of affording a support for the magazine during its removal or replacement. To the latter end, I preferably mount a pair of collars $L^1$ upon the rod L, between which is engaged the bottom longitudinal bar $A^{20}$ of the magazine, during its passage from or to its supporting frame, (see particularly Fig. 4). In this way the magazine is properly and correctly supported and guided in its movement in either direction.

As previously stated, I have shown my invention by way of example and in preferred form, but obviously many changes and variations therein will suggest themselves to those skilled in the art and still be comprised within its scope.

Having thus described my invention, its construction and mode of operation, what I claim and desire to secure by Letters Patent of the United States is as follows:

1. In a typographical machine, the combination of a plurality of removable magazines, and a corresponding plurality of series of escapements mounted independently of the magazines and each series movable at will from its operative position to permit the ready removal of the corresponding magazine.

2. In a typographical machine, the combination of a plurality of removable magazines, a supporting frame for each of the magazines, and a series of escapements mounted on each supporting frame and movable from operative position to permit the removal of the corresponding magazine.

3. In a typographical machine, the combination of a removable magazine, its base frame movable to shift the same into and out of operative position, and a series of escapements for the magazine supported by the base frame independently of the magazine so as to permit the removal of the magazine without removing the escapements.

4. In a typographical machine, the combination of a removable magazine, a movable supporting frame therefor to shift the same into and out of operative position, and a series of escapements connected to said supporting frame and movable into and out of operative relation to the magazine to permit its removal when desired.

5. In a typographical machine, the combination of a removable magazine, a movable supporting frame therefor to shift the same into and out of operative position, and a series of escapements pivotally connected to said supporting frame and movable into and out of operative relation to the magazine to permit its removal when desired.

6. In a typographical machine, the combination of a removable magazine, a movable supporting frame therefor to shift the same into and out of operative relation, and a series of escapements carried by said supporting frame and movable into and out of operative relation to the magazine to permit its removal when desired, together with means to hold the escapements in operative relation to the magazine.

7. In a typographical machine, the combination of a removable magazine and an independently mounted series of escapements movable out of and into operative relation thereto, to permit removal and replacement of a magazine at will, together with means to hold the escapements in operative relation to the magazine, and locking devices for said holding means.

8. In a typographical machine, the combination of a magazine for the type or matrices, a series of escapements movable out of and into operative relation thereto, means for locking the type or matrices in the magazine, and devices controlled by said locking means for preventing the disengagement of the escapements from the magazine.

9. In a typographical machine, the combination of a magazine for the type or matrices and means whereby they may be locked therein, a series of escapements movable out of and into operative relation thereto, and means to prevent the disengagement of the escapements from the magazine until the type or matrices are locked therein.

10. In a typographical machine, the combination of a magazine, a series of escapements B, and a movable frame $B^1$ carrying the said escapements, and provided with a latch C to engage the magazine, and the device D to lock the latch in operative position.

11. In a typographical machine, the combination of a magazine for the type or matrices and means whereby they may be locked therein, a series of escapements B, and a movable frame $B^1$ carrying the said escapements, and provided with a latch C to engage the magazine, holding means for said latch, and the safety catch G controlled in its action by the locking of the type or matrices in the magazine.

12. In a typographical machine, the combination of a magazine for the type or matrices and means whereby they may be locked therein, a series of escapements B, and a movable frame $B^1$ carrying the said escapements, and provided with a latch C to engage the magazine, the holding means D, and the safety catch G to engage the magazine and controlled by the locking of the type or matrices therein.

13. In a typographical machine, the combination of the magazine, its base frame $A^{10}$, the escapements B, the escapement carrying frame $B^1$ pivoted to the frame $A^{10}$, and the latch C on the frame $B^1$ to engage the magazine.

14. In a typographical machine, the combination of the magazine, its supporting frame $A^{10}$, the escapements B, the escapement carrying frame $B^1$ pivoted to the frame $A^{10}$, the latch C, and the locking device D.

15. In a typographical machine, the combination of the magazine, its supporting frame $A^{10}$, the escapements B, the escapement carrying frame $B^1$ pivoted to the frame $A^{10}$, the latch C, the locking device D, and the safety catch G.

16. In a typographical machine, the combination of a magazine for the type or matrices, means for temporarily locking the type or matrices therein, a series of escapements movable out of and into operative relation to the magazine, and means to prevent the unlocking of the type or matrices until the escapements are in proper relation to the magazine.

17. In a typographical machine, the combination of a magazine for the type or matrices, means for temporarily locking the type or matrices therein, a series of escapements movable out of and into operative relation to the magazine, and devices connected to the movable series of escapements to control the said locking means.

18. In a typographical machine, the combination of the magazine for the type or matrices, the locking bar H, the movable escapement-carrying frame $B^1$, and the block D pivoted thereto and adapted to engage the bar H.

19. In a typographical machine, the combination of a magazine for the type or matrices, the locking bar H, the movable escapement-carrying frame $B^1$, the magazine-engaging latch connected thereto, and the movable element D, adapted to engage in one position the latch and in another position the bar H.

20. In a typographical machine, a plurality of magazines, each pivotally mounted at one end thereof to permit a rocking movement thereof, the said magazines being connected in such manner that the rocking movement of one effects the rocking movement of another.

21. In a typographical machine, the combination of a plurality of movable magazines and means for simultaneously moving and separating the magazines to permit the removal of one of them without disturbing the others.

22. In a typographical machine, the combination of a plurality of removable magazines, a plurality of movable supporting frames for the respective magazines, and means to effect their simultaneous movement and separation.

23. In a typographical machine, the combination of a plurality of removable magazines, a plurality of movable supporting frames for the respective magazines, and connections between the several frames to effect their movement and separation simultaneously.

24. In a typographical machine, the combination of a plurality of magazines, each pivotally mounted at one end thereof to permit a rocking movement of one magazine with reference to another, with means to effect their simultaneous rocking and separation.

25. In a typographical machine, the combination of a plurality of magazines, each pivotally mounted at one end thereof to permit a rocking movement of one magazine with reference to another, with connections between the several magazines to effect their simultaneous rocking and separation.

26. In a typographical machine, the combination of a plurality of magazines arranged vertically one above another, each mounted at one end thereof to permit the rocking movement of one magazine with reference to another, with means to effect their simultaneous rocking and vertical separation.

27. In a typographical machine comprising a plurality of removable magazines, the combination of a plurality of supporting frames for the respective magazines, the said frames being each movable vertically to permit of their separation, with connections to effect the simultaneous vertical movement and separation of the said frames.

28. In a typographical machine, the combination of a plurality of removable magazines, suitable supports therefor, and means for simultaneously moving and separating the supports vertically to permit the removal of one of the magazines without disturbing the others.

29. In a typographical machine, the combination of a plurality of removable magazines, suitable supports therefor, and movable connections between them to separate the supports vertically to permit the removal of one of the magazines without disturbing the others.

30. In a typographical machine, the combination of a plurality of removable magazines, suitable supports therefor, and movable links connecting the several supports, whereby the latter may be separated vertically to permit the removal of one of the magazines without disturbing the others.

31. In a typographical machine, the combination of a plurality of magazines, a corresponding plurality of movable supporting frames $A^{10}$ therefor, and the movable links J and $J^1$ connecting the said supporting frames.

32. In a typographical machine, the combination of a plurality of magazines, a corresponding plurality of movable supporting frames $A^{10}$ therefor, and the movable links J and $J^1$ connecting the said supporting frames, together with means to shift one of the said supporting frames.

33. In a typographical machine, the combination of a plurality of magazines, a corresponding plurality of movable supporting frames $A^{10}$ therefor, and the movable links J and $J^1$ connecting the said supporting frames, together with a manually operable cam to shift one of the said supporting frames.

34. In a typographical machine, the combination of a vertically movable and removable magazine, a pair of cam arms for elevating it, and a transverse rod connecting the two arms, whereby the operation of the arms locates the transverse rod in position to support the magazine during its removal from the machine.

In testimony whereof I hereunto set my hand this 18th day of April, 1912, in the presence of two attesting witnesses.

THOMAS SIMMONS HOMANS.

Witnesses:
  E. H. ALLEN,
  C. E. GRANT.